United States Patent
Bacci et al.

(10) Patent No.: US 7,632,894 B2
(45) Date of Patent: Dec. 15, 2009

(54) PROCESS FOR CROSS-LINKING THERMOPLASTIC POLYOLEFIN ELASTOMER COMPOSITIONS

(75) Inventors: Dino Bacci, Pordenone (IT); Roberta Marchini, Runco (IT); Carlo Mulas, Mogliano Veneto (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 10/469,657

(22) PCT Filed: May 29, 2002

(86) PCT No.: PCT/EP02/05908

§ 371 (c)(1),
(2), (4) Date: Sep. 2, 2003

(87) PCT Pub. No.: WO02/102880

PCT Pub. Date: Dec. 27, 2002

(65) Prior Publication Data

US 2004/0236032 A1    Nov. 25, 2004

(30) Foreign Application Priority Data

Jun. 15, 2001    (EP)    .................. 01114459

(51) Int. Cl.
*C08F 8/30*    (2006.01)
*C08J 3/24*    (2006.01)
*C08J 3/22*    (2006.01)

(52) U.S. Cl. ............... 525/333.7; 525/333.8; 525/375; 525/385; 525/387; 525/332.5

(58) Field of Classification Search ............ 525/240, 525/332.5, 333.8, 343, 387, 333.7, 375, 385
See application file for complete search history.

(56) References Cited

U.S. PATENT DOCUMENTS

| | | | | |
|---|---|---|---|---|
| 4,088,714 A * | 5/1978 | Huff | .................. | 525/193 |
| 4,108,947 A * | 8/1978 | Kimura et al. | ............... | 525/97 |
| 5,218,046 A | 6/1993 | Audureau et al. | ........... | 525/194 |
| 5,308,700 A * | 5/1994 | Hikasa et al. | ............... | 428/402 |
| 5,334,663 A | 8/1994 | Audureau et al. | ........... | 525/194 |
| 5,539,052 A * | 7/1996 | Shieh et al. | ............... | 525/92 R |
| 5,891,553 A * | 4/1999 | Hendrix et al. | ............. | 428/209 |
| 2001/0018475 A1* | 8/2001 | Tominaga et al. | ............. | 524/62 |

FOREIGN PATENT DOCUMENTS

| EP | 0400333 | 12/1990 |
|---|---|---|
| EP | 0472946 | 3/1992 |
| EP | 0721972 | 7/1996 |
| EP | 721972 * | 7/1996 |

* cited by examiner

*Primary Examiner*—Roberto Rábago
(74) *Attorney, Agent, or Firm*—William R. Reid

(57) ABSTRACT

A process for cross-linking an elastomer-containing thermoplastic polyolefin composition comprising the steps of preparing a masterbatch by mixing and/or masticating an elastomeric polyolefin with a cross-linking co-agent, and optionally an additive, in the presence of a thermoplastic polyolefin; then, cooling the masterbatch obtained in the preceding step at least up to the solidification of the thermoplastic polyolefin; and finally mixing and/or masticating the masterbatch, after the cooling step, with a cross-linking agent and optionally an additive.

2 Claims, No Drawings

PROCESS FOR CROSS-LINKING THERMOPLASTIC POLYOLEFIN ELASTOMER COMPOSITIONS

This application is the U.S. national phase of International Application PCT/EP02/05908, filed May 29, 2002.

The present invention relates to a process for preparing a cross-linked elastomer-containing thermoplastic polyolefin composition. More particularly, the present invention concerns a dynamic cross-linking process.

According to conventional processes, the polymer compositions to be cross-linked are blended with a cross-linking agent and co-agent (i.e. the cross-linking system) that are added simultaneously in a mixer or extruder. Alternatively, it is also known the addition of the cross-linking agent later than that of the cross-linking co-agent in an extruder.

The applicant has now found a more efficient dynamic cross-linking process that achieves a higher cross-linking degree. Moreover, thanks to the process of the present invention superior mechanical properties are obtained the amount of cross-linking system used being equal.

The known processes for cross-linking, generally, take place in extruders having a high length/diameter ratio. Normally, the ratio is 50 or higher. The said high ratio is necessary to allow the addition of the cross-linking co-agent and of the cross-linking agent in two consecutive steps.

Thanks to the present process such long extruders are no longer required. In fact, the present process comprises two separate mastication and/or mixing steps that can be carried out in conventional extruders having a length/diameter ratio generally from about 10 to 35.

Therefore, the present invention provides a process for cross-linking an elastomer-containing thermoplastic polyolefin composition, comprising the steps of:

1) preparing a masterbatch by mixing and/or masticating an elastomeric polyolefin with a cross-linking co-agent, and optionally an additive, in the presence of a thermoplastic polyolefin;
2) cooling the masterbatch obtained in step (1) at least up to the solidification of the thermoplastic polyolefin, preferably up to ambient temperature (about 23° C.); and
3) mixing and/or masticating the masterbatch, after the cooling step 2, with a cross-linking agent and optionally with an additive.

The thermoplastic polyolefin can be selected from a crystalline homopolymer of propylene or a crystalline random copolymer of propylene with ethylene and/or a $C_4$-$C_{10}$ α-olefin, such as 1-butene, 1-hexene and 4-methyl-1-pentene. Ethylene and 1-butene are the preferred comonomer repeating units. Typically, the comonomer repeating unit content is up to 15% by weight.

The thermoplastic polyolefin can be obtained by polymerizing the monomer(s) in the presence of highly specific Ziegler-Natta catalysts, for example, according to known process conditions.

The said elastomeric polyolefin is typically used in amounts from 5 to 90, preferably from 40 to 90, parts by weight per 100 total parts by weight of the polyolefin moiety, i.e. the elastomeric polyolefin plus the thermoplastic polyolefin.

The elastomeric polyolefin can be selected from unsaturated and, preferably, saturated polymers. Elastomeric polyolefins of these kinds are well known in the art, and generally defined as ethylene-propylene rubbers (EPR) and their modification with dienes (EPDM). They generally have a density of 0.88 g/ml or less.

Examples of suitable elastomeric polyolefins are copolymers of ethylene with a $C_3$-$C_8$ α-olefin and, optionally, minor amounts, preferably from 0.5% to 10% by weight, of a diene. preferred examples are copolymers of propylene with 25% to 75%, preferably 30-75%, by weight of ethylene. Such polyolefins have, typically, a Mw/Mn ratio over 4 and are, generally, prepared by using Ziegler-Natta catalysts.

The diene can be selected in particular from 1,4-butadiene, 1,4-hexadiene, 2-methyl-1-pentene, norbornadiene and 5-ethylidene-2-norbornadiene.

Other suitable examples of elastomeric polyolefins are ethylene copolymers containing at least 20%, preferably from 20 to 70%, by weight of a $C_4$-$C_8$ α-olefin and having a Mw/Mn ratio less than 4. Specific examples are copolymers of ethylene with 20-40% by weight of 1-octene ($^{13}$C-NMR analysis) having, typically, density of less than 0.89 g/ml.

The elastomeric polyolefin has, typically, intrinsic viscosity values greater than 1.5 dl/g, preferably over 3 dl/g.

The above mentioned co-agent is selected from those commonly used on this purpose. Examples of preferred co-agents are triallyl cyanurate, tryallyl isocyanurate, 1,2-polybutadiene and derivatives of the methacrylate and acrylate compounds, such as ethylene glycol and dimethyl cyanurate.

The most preferred cross-linking agents are selected from free radical initiators, in particular organic peroxides.

The organic peroxides that can be used in the process of the present invention are those commonly used in cross-linking processes. In particular, it is preferable to use peroxides having long half-life times, from 3 to 20 minutes, for example, at a temperature used in the cross-linking process. Specific examples of said organic peroxides are: di-t-butyl-peroxide isopropyl benzene, dicumyl peroxide, monocumyl(t-butyl) peroxide, di(t-butyl)peroxide, 2,5-dimethyl-2,5-di(t-butylperoxy)-hexane.

In accordance with the present invention the elastomer-containing thermoplastic composition subjected to cross-linking can be a mechanical blend obtainable by introducing the elastomeric polyolefin and the thermoplastic polyolefin separately in the equipment used in step (1). In this case it is preferable that the mastication and/or mixing of the polyolefins be continued up to obtaining an intimate and homogeneous mixture of the elastomeric polyolefin in the melted thermoplastic polyolefin, with the elastomeric polyolefin being in the form of particles with sizes of about 0.5 to 5 microns.

The elastomer-containing thermoplastic polyolefin composition subjected to cross-linking can also be a reactor blend, i.e. directly obtained in a polymerization process carried out in two or more separate and subsequent stages, wherein the thermoplastic polyolefin and the elastomeric polyolefin are prepared. In each stage subsequent to the first stage the polymerization takes place in the presence of the polymer obtained in the preceding stage(s). preferably, in the first stage(s) the thermoplastic polyolefin is prepared and in the subsequent stage(s) the elastomeric polyolefin is prepared. The polymerization takes place in the presence of suitable catalysts, such as highly specific Ziegler-Natta catalysts and, optionally, with metallocene catalysts.

In the most preferred process according to the present invention the reactor-blend composition that is introduced in the equipment used in step (1) comes directly from the polymerization reactor, i.e. the reactor blend is not transformed into pellets before being mixed or masticated with the cross-linking co-agent and then with the cross-linking agent.

Examples of the above-mentioned elastomer-containing thermoplastic polyolefin compositions are the following heterophasic compositions (parts and percentage by weight):

A) from 10 to 60 parts, preferably form 10 to 50 parts, of a homopolymer of propylene or a random copolymer of propylene with ethylene and/or a $C_4$-$C_8$ α-olefin, containing more than 80% of propylene and being insoluble in xylene at ambient temperature for more than 80%;

B) from 0 to 25 parts, preferably from 1 to 25 parts, more preferably, from 7 to 15 parts, of an essentially linear semicrystalline copolymer of ethylene containing propylene and/or a $C_4$-$C_8$ α-olefin, insoluble in xylene at ambient temperature; and C) from 15 to 87 parts, preferably from 30 to 85 parts, of a copolymer of ethylene with propylene and/or a $C_4$-$C_8$ α-olefin, or mixture thereof, and optionally minor quantities of diene, said copolymer containing from 25 to 75% of ethylene and being soluble in xylene at ambient temperature.

Portion (A) is a propylene homopolymer having preferably an insolubility in xylene greater than 90% by weight, more preferably greater than 95%, or a copolymer containing preferably more than 85%, more preferably from 90 to 99%, by weight of propylene.

Said portion (B) has a crystallinity preferably ranging from 20 to 60%, determined by differential scanning calorimetry. The copolymer comprised in said fraction is preferably selected from the following types of copolymers: ethylene-propylene, containing greater than 55% by weight of ethylene; ethylene-propylene-$C_4$-$C_8$ α-olefin, containing 55-98%, preferably 80-95%, by weight of ethylene and the said α-olefin and from 1 to 10% by weight of the said α-olefin; and ethylene-$C_4$-$C_8$ α-olefin, containing 55-98%, preferably 80-95%, by weight of the said α-olefin.

In said portion (C) the ethylene content ranges preferably from 30 to 75%, more preferably it is less than 60%, by weight.

published European patent applications Nos. 400,333 and 472,946 describe the said heterophasic compositions as well as the catalysts and the polymerization processes commonly used for their preparation.

In accordance with the present invention the elastomer-containing thermoplastic composition is mixed with a cross-linking co-agent in an amount ranging preferably from 1 to 8 parts by weight based on 100 parts by weight of the elastomeric polyolefin. The amount of cross-linking co-agent depends on the degree of cross-linking that one wants to impart to the final cross-linked composition.

The thus obtained masterbatch is then added with a cross-linking agent in an amount ranging preferably from 0.5 to 2 by weight based on 100 parts by weight of the elastomeric polyolefin in the elastomer-containing thermoplastic composition.

Step (1) and step (3) of the dynamic cross-linking process of the present invention are carried out according to known techniques. In particular, the mastication and/or mixing process of the polyolefin composition with the cross-linking co-agent in step (1) can take place in the equipment commonly used on this purpose, such as an internal mixer, e.g. Banbury mixer, and a single- or twin-screw extruder with mixing components, e.g. Buss extruder, and having a length/diameter ratio of about 35 or less.

In step (3) the cross-linking process, always operating in a masticating and/or mixing mode, takes place in the same equipment described above for step (1).

The conditions of mastication and/or mixing are those known to a person skilled in the art according to known processes. The mastication and/or mixing takes place at a temperature over the melting temperature of the polymers; it also depends on the type of the cross-linking agent. Typically the process temperature ranges from 120 to 250° C. preferably each of steps (1) and (3) lasts from 1 to 10 minutes.

During the process according to the present invention various additives conventionally used for rubber formulation, thermoplastic polyolefins and polymer processing can be added. Such additives include cross-linking accelerators (e.g. ZnO), mineral oil, inorganic fillers, processing aids, wax, colorants, plasticizers, carbon black, antioxidants and stabilizers, such as UV stabilizers, hindered phenols and HALS. Such additives may be added during step 1 or 3 or both steps of the process according to the present invention.

The present invention also relates to a masterbatch as recited in the claims. The term "solid" is used to mean that in the masterbatch as obtained at the end of above step (2) the polymer blend is solid (as opposed to molten), as the masterbatch is recovered after cooling up to the solidification of the thermoplastic polyolefin, preferably up to ambient temperature (i.e. 23° C.).

The following examples are given in order to illustrate but not limit the present invention.

The data reported in the examples relative to the properties of the compositions obtained have been determined according to the methods indicated below.

Solubility in xylene: a solution of the sample in xylene at a concentration of 1% by weight is prepared and kept at 135° C. for one hour while stirring. The solution is allowed to cool to 95° C., while stirring, after which it is kept for 20 minutes without stirring, and for 10 minutes under stirring. The solution is then filtered, and acetone is added to an aliquot of the filtrate to cause the polymer dissolved therein to precipitate. The polymer thus obtained is recovered, washed, dried, and weighed to determine the weight of xylene soluble fraction.

Shore A hardness: ASTM D-2240;
Elongation at break: ASTM D-412
Tensile strength: ASTM D-412;
Compression set: ASTM D-395, method B.

The materials used in the examples of the present invention are listed as follows:

elastomer-containing thermoplastic polyolefin composition (1) consisting of the following portions:
  A) 17% by weight of a (propylene-co-ethylene)polymer containing 3.3% by weight of ethylene repeating units and having a xylene-solubility at room temperature of 5.5% by weight; and
  B) 83% by weight of an ethylene-propylene copolymer rubber (EPR), containing 90 wt % of a portion soluble in xylene at room temperature; wherein the xylene-soluble copolymer contains 44% by weight of ethylene repeating units and has an intrinsic viscosity of 3.5 dl/g; the xylene-insoluble copolymer contains 70% by weight of ethylene repeating units;

elastomer-containing thermoplastic polyolefin composition (2) consisting of the following portions:
  A) 30% by weight of a propylene-homopolymer having MFR 0.2 (230, 2.16 Kg)
  B) 70% by weight of an ethylene-propylene copolymer rubber (EPR), comprising 90% weight of a portion soluble in xylene at room temperature; wherein the xylene-soluble copolymer contains 61% by weight of ethylene repeating units and has an intrinsic viscosity of 3 dl/g; the xylene-insoluble copolymer contains 90% by weight of ethylene repeating units;

Rhenogran® ZnO 80: 80% by weight of zinc oxide masterbatch and 20% by weight of an ethylene-propylene elastomer;

Rhenogran® TAC-50: 50% by weight of triallylcianurate and 50% by weight of an ethylene-propylene-diene elastomer;

Trigonox® 101/50: 50% by weight of 2,5-bis(tert-butylperoxy)-2,5-dimethylhexane master batch in an inert powder.

EXAMPLE 1

93% by weight of polyolefin composition (1) coming directly from a polymerization reactor, 2.5% by weight of Rhenogran® TAC 50 and 4.5% by weight of Rhenogran® ZnO 80 are introduced in a twin-screw extruder (L/D ratio>15) at 180-200° C. The mixture thus obtained is discharged as a pellet type masterbatch and then cooled up to room temperature.

Successively, in a twin-screw extruder (L/D ratio is 36) turning at 150 rpm and having temperature of 200-220° C., the said pellet masterbatch is introduced in such an amount as to constitute 84.5% by weight of the total. Thereafter, 14% by weight of paraffinic oil, 1.5% by weight of Trigonox® D 101/50 are added to the molten polymer and the extrusion is continued for at least a remaining screw length L/D of 15.

Finally, the thus cross-linked thermoplastic elastomeric polyolefin composition is subjected to a further kneading after the addition of a conventional package of stabilizers in the twin screw extruder.

The thermoplastic elastomeric polymer composition thus cross-linked has the following properties:
Hardness: 65 Shore A points;
Elongation at break: 200%;
Tensile strength: 4.5 MPa;
Compression set (70° C. and 22 h): 50%.

EXAMPLE 2

Example 1 is repeated on a Brabender internal mixer at 190° C. (chamber conditions) and 90 rpm. The Rhenogran® TAC 50 and Rhenogran® ZnO 80 are introduced into the mixer together with the polymer and after 3 minutes the blend is extracted and cooled.

Successively the blend is reintroduced into the mixer and the paraffinic oil is added. After 2 minutes the Trigonox® 101/50 is introduced into the mixer. The mixing is continued at a melt temperature of 200° C. for 3 minutes.

Then the cross-linked composition is discharged.

The thermoplastic elastomeric polymer composition thus cross-linked has the following properties:
Hardness: 65 Shore A points;
Elongation at break: 200%;
Tensile strength: 4.5 MPa;
Compression set (70° C. and 22 h): 50%.

EXAMPLES 3-6

Example 2 is repeated with the exception that the polyolefin composition (2) is blended with different amounts of Rhenogran® TAC 50 (see Table 1) in a Brabender internal mixer. The used amounts of co-agent and the values of compression set thus obtained are shown in Table 1 below.

COMPARATIVE EXAMPLES 1c-4c

Examples 3-6 are repeated except that the mixing is carried out in one step, without intermediate cooling. The Brabender internal mixer is set at 190° C. (chamber conditions) and 90 rpm. The Rhenogran® TAC 50 and Rhenogran® ZnO 80 are introduced into the mixer together with the polymer and after 3 minutes the paraffinic oil is added. After 2 minutes Trigonox® 101/50 is introduced into the extruder. The extrusion is continued at a melt temperature of 200° C. for 3 minutes.

Then the cross-linked composition is discharged.

The used amounts of co-agent and the values of compression set thus obtained are shown in Table 1 below.

TABLE 1

| Examples and Comparative Examples | Co-agent (wt %) TAC 50 | Compression set (%) |
|---|---|---|
| 3 | 1 | 44.5 |
| 1c |  | 48 |
| 4 | 2 | 39 |
| 2c |  | 45 |
| 5 | 3 | 36 |
| 3c |  | 42 |
| 6 | 4 | 29 |
| 4c |  | 38 |

The invention claimed is:

1. A masterbatch consisting essentially of a solid blend of an elastomeric polyolefin, a thermoplastic polyolefin, and triallyl cyanurate,
    wherein the portion made up of the elastomeric polyolefin and the thermoplastic polyolefin is in the form of an elastomer-containing thermoplastic polyolefin composition comprising (parts and percent by weight):
        A. from 10 to 60 parts of a homopolymer of propylene or a random copolymer of propylene with ethylene and/or a $C_4$-$C_8$ α-olefin, containing more than 80% of propylene, said homopolymer or copolymer being insoluble in xylene at ambient temperature for more than 80%;
        B. from 0 to 25 parts of an essentially linear semicrystalline copolymer of ethylene containing propylene and/or a $C_4$-$C_8$ α-olefin, insoluble in xylene at ambient temperature; and
        C. from 15 to 87 parts of a copolymer of ethylene with propylene and/or a $C_4$-$C_8$ α-olefin, or mixture thereof, and optionally minor quantities of diene, said copolymer containing from 25 to 75% of ethylene and being soluble in xylene at ambient temperature.

2. A masterbatch consisting essentially of a solid blend of an elastomeric polyolefin, a thermoplastic polyolefin, and tryallyl isocyanurate,
    wherein the portion made up of the elastomeric polyolefin and the thermoplastic polyolefin is in the form of an elastomer-containing thermoplastic polyolefin composition comprising (parts and percent by weight):
        A. from 10 to 60 parts of a homopolymer of propylene or a random copolymer of propylene with ethylene and/or a $C_4$-$C_8$ α-olefin, containing more than 80% of propylene, said homopolymer or copolymer being insoluble in xylene at ambient temperature for more than 80%;
        B. from 0 to 25 parts of an essentially linear semicrystalline copolymer of ethylene containing propylene and/or a $C_4$-$C_8$ α-olefin, insoluble in xylene at ambient temperature; and
        C. from 15 to 87 parts of a copolymer of ethylene with propylene and/or a $C_4$-$C_8$ α-olefin, or mixture thereof, and optionally minor quantities of diene, said copolymer containing from 25 to 75% of ethylene and being soluble in xylene at ambient temperature.

* * * * *